Patented Nov. 19, 1929

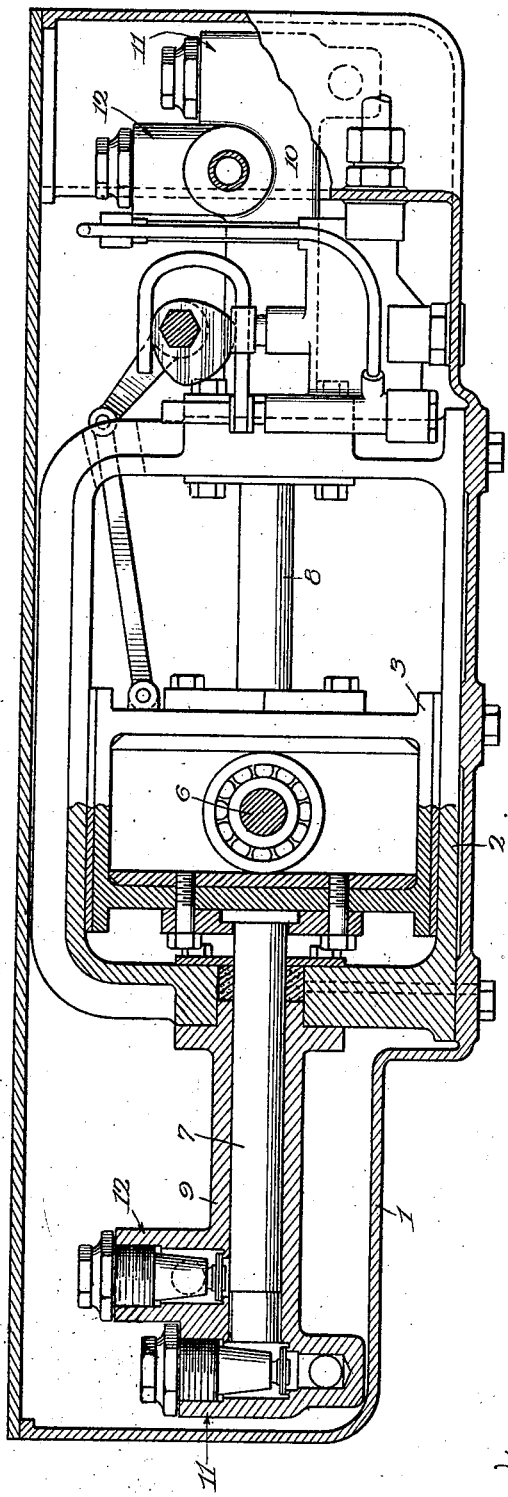

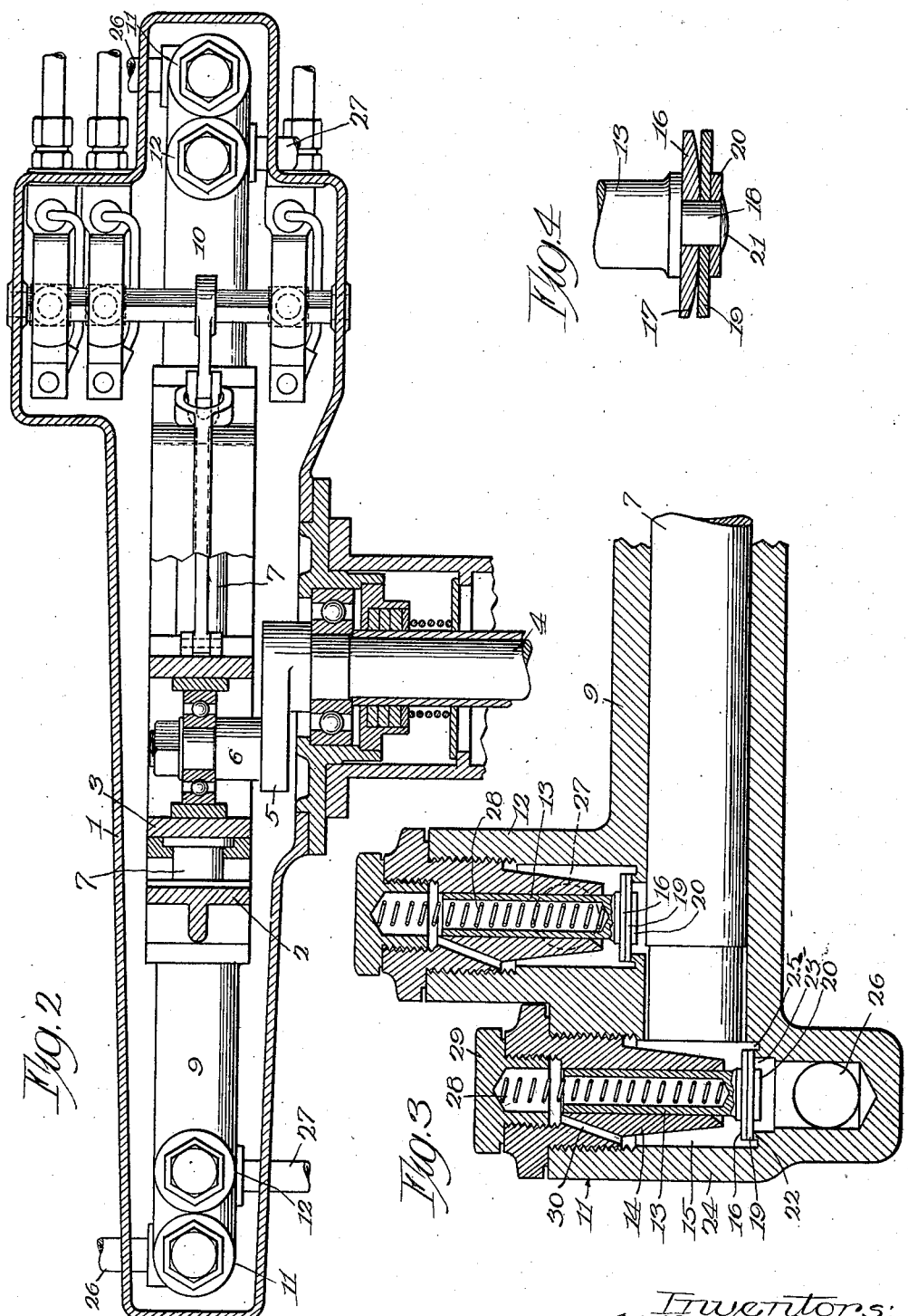

1,735,888

UNITED STATES PATENT OFFICE

WILLIAM E. BAKER AND RICHARD C. ALAND, OF CLEVELAND, OHIO, ASSIGNORS TO WILLIAM EDGAR BAKER AND GEORGE ALTON FRANTZ, TRUSTEES OF THE WEB ENGINEERING COMPANY, OF CLEVELAND, OHIO

VALVE

Application filed January 18, 1926. Serial No. 81,966.

This invention relates to novel and improved means for pumping a fluid and has particular applicability when used in connection with a steam system.

The primary object of the invention is to provide a valve for use in connection with a pump which shall be self grinding and self cleaning and which shall also be positive and efficient in use.

In the accompanying drawings in which we have shown a selected embodiment of our invention;

Fig. 1 is a vertical longitudinal view through an assembly having our invention embodied therein.

Fig. 2 is a horizontal longitudinal section through the structure shown in Fig. 1.

Fig. 3 is a section of one end of the structure shown in Fig. 1, but drawn upon an enlarged scale to show the construction of the valves.

Fig. 4 is a still further enlarged view of the end of one of the valve stems, the proportions of certain of the parts being exaggerated to better disclose the invention.

Referring now in detail to the drawings, the numeral 1 designates a suitable casing in which our invention may be supported and mounted in this casing is a guide frame 2 provided with guideways upon which reciprocates a Scotch yoke 3. The yoke is reciprocated by any suitable means, the means here illustrated comprising a shaft 4 driven from a sutiable source of power and having at its end a crank 5, the crank pin 6 of which is received within suitable bearings in the yoke. Obviously as the shaft 4 rotates the yoke 3 will reciprocate in the frame.

The yoke 3 is provided with a pair of plunger pitons 7 and 8 which reciprocate in cylinders 9 and 10 respectively. Adjacent the end of each cylinder is disposed an inlet controlled by a valve 11 and an outlet controlled by a valve 12. The structure being symmetrical, so far as the water pumps are concerned, we will content ourselves with a description of the left end thereof, as viewed in the drawings. The valves 11 and 12 are also alike except that one controls the inlet and the other the outlet at its respective end.

Referring particularly to Fig. 3, it will be seen that the valve 11 shown therein comprises a stem 13 slidably mounted in a bore in the plug 14. The lower end of the stem extends into the chamber 15 and has mounted thereon a disk 16. The construction of this disk is best shown in Fig. 4 and referring thereto it will be seen that the bottom surface 17 of the disk is provided with a concave curve which may be substantially spherical. The disk 16 is mounted upon the reduced end 18 of the stem and disposed immediately beneath the disk 16 is another disk 19 which is relatively thin and is also flexible in respect to the disk 16. Both disks are secured in place as by a washer 20 and the upset end 21 of the reduced portion 18. The lower disk 19 engages with a seat here shown as an annular shoulder 22 surrounding the opening 23 in the body 24 of the valve. The shoulder 22 is surrounded by an annular recess 25 for a purpose which will presently appear.

The valve 11 is shown as controlling the inlet 26 and the valve 12 of exactly similar construction is shown as controlling the outlet 27. It will be obvious that as the piston 7 is moved towards the right in the cylinder 9, the valve stem 13 will be lifted by the pressure of water in the inlet 26 and water will enter the cylinder 9. As the piston is moved towards the left the valve 11 will be closed and the water will be forced out through the outlet 27, the valve 12 being opened by the pressure of the water in the cylinder. Each valve stem is held in position to maintain the disk 19 in engagement with the seat formed by the shoulder 22, by means of the spring 28, this spring being shown as received within a recess in the stem 13 and in another recess in a cap 29 threaded into the plug 14. This plug 14 is held in position in the body 24 as by being threaded therein, as plainly shown. As the stem reciprocates in the bore which receives it, there is a tendency for the air above the stem and between the plug 14 and the cap 29 to become exhausted, thus forming a partial vacuum which will tend to cause the stem to be lifted so as to partially open the valve. To avoid this condition we provide the plug with one or more air passages 30 which connect the chamber 15 with the space above the stem 13. By this means the formation of any vacuum is effectively prevented.

As the disk 19 is brought into engagement with the seat formed by the shoulder 22, the disk will tend to conform with the curved surface 17. By this means any slight inaccuracy of fit between the valve seat and the disk will be offset, as the disk 19 can bend to fit the seat regardless of any slight irregularity therein. Moreover as the disk 19 bends it must move along the surface of the seat and this will give a cleaning action and also a grinding action so that the seat will be kept clean and will also be ground to a proper fit. The cleaning action is helped by the provision of the recess 25, whereby water passing the disk will wash over the seat and will deposit any small particles of dirt thereon in the recess 25. Such particles will normally be carried along in the water on succeeding strokes of the piston so that no great accumulation thereof is apt to take place.

The valves which we employ in the water pumps and which are preferably of the form shown are very efficient because of the fact that they are extremely simple in construction and therefore may be easily made, and also because they are self cleaning and self grinding as pointed out above. The provision in the valves of the vacuum release means exemplified by the air passages 30 increases the efficiency of the valves by insuring that the valves do not have to contend with any pressure for which they are not designed. That is, they only have to take care of the ordinary pressure of the water on the one side and of the spring on the other.

We have greatly reduced, and speaking generally, have eliminated vibration and noise in the operation of pumps. It will be observed that the inlet and the outlet are of large size with relation to the cylinder and this, in addition to the absence of numerous turns of connections, tends to eliminate water hammer. The plug 14 forms a guide support for the stem and extends to a point closely adjacent to the valve seat, 22 thereby preventing the valve from raising too high off of the seat which would tend to produce a noise. The plug also holds the valve and its stem in proper position, prevents the valve from tipping and the valve stem is mounted to turn in the plug so that the valve is capable of freeing itself from dirt. The valves are capable of yielding slightly upon seating which tends to cushion the shock.

We are aware that changes in the form, construction and arrangement of parts may be made without departing from the spirit and without sacrificing the advantages of the invention and we consider ourselves entitled to make all such changes as fairly fall within the scope of the following claims.

We claim:

1. A valve comprising a casing having a seat, a stem having a flexible disk adapted to contact with said seat, a member carried by said stem on the side of said disk opposite from said seat and having a curved surface next to said disk whereby when said disk contacts with said seat it may bend and conform to said curved surface and move along the surface of said seat, and a spring engaging said casing and urging said disk into engagement with said seat.

2. A valve comprising a body having an opening for the passage of a fluid therethrough, said opening being surrounded by a seat in the form of an annular shoulder, a recess surrounding said shoulder to receive particles of dirt removed from the seat of the valve in the seating action, a stem for said valve, and a spring arranged in a recess in said stem for normally maintaining said valve in said seat.

3. A valve comprising a body having an opening for the passage of a fluid therethrough, said opening being surrounded by a seat in the form of an annular shoulder, a recess surrounding said shoulder, a stem having a flexible disk adapted to contact with said seat, and a member having a curved surface on the other side of said disk from said seat whereby when said disk is brought into engagement with said seat it may bend to conform with said curved surface and move along the surface of said seat.

4. A valve comprising a body having an opening for the passage of a fluid therethrough, said opening being surrounded by a seat in the form of an annular shoulder, a recess surrounding said shoulder, a stem having means adapted to engage with said seat and move upon the same to clean the face of the seat and deposit any removed subsance into said recess and means arranged in a recess in said stem for urging said first named means into engagement with said seat.

5. A valve comprising a body having an opening for the passage of a fluid therethrough, said opening being surrounded by a seat in the form of an annular shoulder, a recess surrounding said shoulder, and a stem having a disk adapted to engage with said seat, said disk being flexible whereby it may yield and conform to irregularities in said seat and in its movement keep said seat free from deposits and a spring for urging said disk against said seat.

WILLIAM E. BAKER.
RICHARD C. ALAND.